Jan. 15, 1946.    L. E. THIBEAULT    2,392,956
AUTOMATIC BRAKE ADJUSTER
Filed April 20, 1945

INVENTOR.
Leon E. Thibeault
BY Christian R. Nielsen.
ATTORNEY

Patented Jan. 15, 1946

2,392,956

UNITED STATES PATENT OFFICE 2,392,956

AUTOMATIC BRAKE ADJUSTER

Leon E. Thibeault, Flint, Mich., assignor of one-half to Joseph Thibeault, Flint, Mich.

Application April 20, 1945, Serial No. 589,395

4 Claims. (Cl. 188—79.5)

The invention relates to automatic brake adjusters, and has for an object to effect improvements in that type of adjuster illustrated in my Patent No. 2,291,662, issued August 4, 1942.

An important aim of this invention is to simplify the construction of the device to the end of lowering costs and reducing difficulty in assembly, and at the same time, to effect a marked improvement in the functioning of the device.

A particularly important aim of the invention is to simplify the manner of mounting the device upon the assembly plate of an axle or the like, and even more important, to simplify the adjustment of the device to the brake shoe, so that little time need be lost in effecting the necessary emplacement of the device, and also, to simplify the adjustment of the compensating device, so that it will work or operate with great certainty, and yet in such manner that its adjustment by inexperienced workmen may be carried out with great certainty.

It is also an aim to effect a novel manner of mounting the clutch device, to the end that great simplicity in its manufacture and assembly may be effected.

Additional objects, advantages and features of invention reside in the construction, arrangement and combination of parts, which will be more particularly set forth in the appended description and accompanying drawing, wherein Figure 1 is a schematic conventionalized view of a brake in which my invention has been incorporated.

Figure 1:
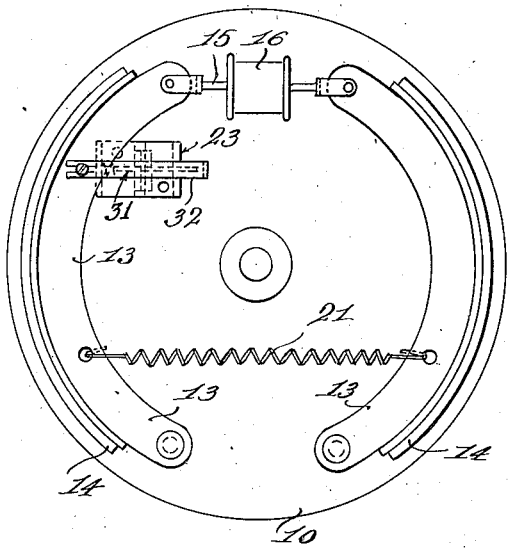
Figure 1 is an elevational view of a brake assembly on an assembly plate 10, the brake device being conventionally illustrated, as it may consist of any usual hydraulic double-acting brake in which expanding brake shoes are forced in opposite directions, the operative connections being of any usual kind, and not being illustrated herein.

In the event that the brake operating linkage between the ends of the shoes 11 is of such nature that movement of one shoe will involve like movement of the other in the opposite direction, but one of my devices need be installed in each brake, but if necessary, one device may be installed for each shoe, substantially in the relation shown in my prior patent mentioned. For this reason, but one device will be described, and where necessary, may be duplicated at the opposite brake shoe in case two are required.

The brake includes two arcuate brake shoes 13, substantially as in my prior patent, although they may conform to conventional usage. Two are usually provided in brakes now generally used upon automobiles, being pivoted at one end, and brake operating linkage 15 being connected to their opposite ends and associated with the brake cylinder 16 or other device for thrusting these linkages in opposite directions so as to spread the shoes apart and against the flange 11 of the brake drum which is rotatable around the shoes, as usual. These shoes are faced conventionally as at 14, with a renewable material, of suitable frictional quality, which is the principal wearing element of brakes. The brake shoes have the usual stiffening flange 20 of planiform shape, and there is conventionally shown a retracting spring 21 hooked between the two shoes to hold them yieldably retracted, which is a practice in a great many brakes of this kind.

Figure 2:
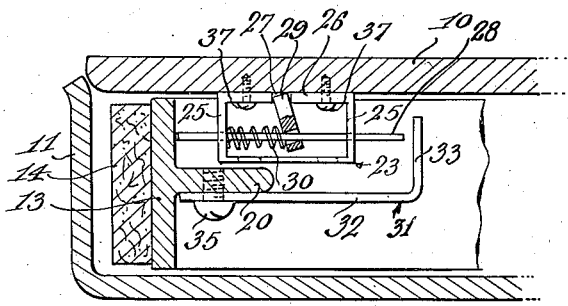
Figure 2 is an enlarged sectional view of one shoe and my adjuster applied thereto.

On the assembly plate 10, closely adjacent one of the shoes there is a small box case housing 23, which is formed of a simple rectangular blank of strap metal having its two end portions bent at right angles at a distance from the middle of the blank, in the same direction, and then bent inwardly toward each other, the central part constituting a body 24, the downturned intermediate parts forming end walls 25, while the inturned ends constitute base plates 26, the space between their end edges constituting a slot or channel 27, with an important function to be subsequently described. The extent of the end walls 25 between the body 24 and the base plates 26 preferably is such as to allow the case to lie against the assembly plate 10 between the latter and the flange 20 of the shoe. The body portion 24 is oblong, as shown, and in each of the end walls 25 centrally located openings are formed, in which there is slidable an adjuster rod 28. A clutch block 29 of hardened steel is set in the slot 27 adapted to lie parallel to or inclined between the walls 25, in a plane normal to the plate 10, and being apertured to receive the rod 28 loosely, the opening, however, being smoothly bored so that at its ends angular edges are formed. The opening through the clutch plate is sufficiently larger than the diameter of the rod 28 to permit the plate 28 to be inclined so that the angular edges around the bore may bind against the rod and so that the plate 29 cannot slip on the rod. A protractile helical spring 30 is engaged around the rod between the clutch plate 29 and that end wall 25 which is next to the shoe, so as to press the plate inwardly from the shoe. The lower edge of the plate 29 is thus held by the slot 27, and the plate caused to become inclined, as shown in Figure 2. The upper edge of the plate is preferably spaced from the body portion 24 of the housing 23, so as to afford free movement for the clutch plate under the part 24.

The housing 23 is preferably mounted at such position on the plate 10 as to afford a good clearance between the brake shoe 13 and the adjacent end wall 25 when the brake shoe is fully retracted with new lining, in place thereon. This retracted position of the newly lined shoe, is approximately as shown in Figure 2, in which position the rod 28 is adjusted so as to bear against the inner face of the shoe 13, an ample opposite end portion of the rod still being projected through the inner wall 25 of the case 23 to be engaged by an automatic adjuster 31 carried by the brake shoe. This adjuster is also a simple blank of strap metal, preferably of somewhat thicker material than that of the case 23. It includes a planiform arm portion 32 and a presser plate or finger 33 bent at right angles thereto. The extremity of the arm 32 is formed with an open longitudinal slot 34, and this end of the arm is laid flat upon the upper side of the flange 20 of the brake shoe and secured by means of a large-headed screw 35 set through the slot and engaged in the flange 20 so as to clamp the end of the arm 32 against the flange 20. When so secured, the arm 32 extends in parallel relation to the assembly plate 10 of the brake. The arm is so adjusted with respect to the rod 28 that the finger plate 33 extends toward and in a plane normal to the rod 28, and when the brake is released the finger plate is spaced from the adjacent end of the rod 28 a distance approximately equal to the space between the lining 14 of the brake shoe and the flange 11 of the drum. The finger stops short of the plate 10, and is so located that on application of the brake the arm 32 and finger will be moved with the shoe 13 so that as the lining 14 engages with full braking effect against the flange 11 of the drum the finger 32 will stop just at or short of the end of the rod 28.

Thereafter, as the lining 14 of the brake wears away, each time that the brake is applied it will move further toward the flange of the drum, and this will permit the finger 33 to engage the inner end of the rod 28 and thrust it in the same direction that the brake shoe is moved in application. When the rod is so moved, the thrust plate 29 will allow this movement freely, any tendency of the plate to bind upon the rod 28 causing the plate to be moved toward a position at right angles to the rod 28, so that the rod becomes freed and the spring 30 is permitted to hold the plate 29 in slightly binding engagement with the rod, so that when pressure is removed from the rod tending to thrust it toward the brake, the thrust plate 29 will again bind the rod and hold it against return.

The result of engagement of the rod by the finger 33 is to cause the rod to support the shoe 33 after a slight releasing action, so that excessive movement of the shoe from full braking position will not occur, and in consequence, thereafter, only moderate and normal operations of foot pedals and other brake applying means is required to move the shoe to full braking position, throughout the life of the lining 14.

Figure 3:
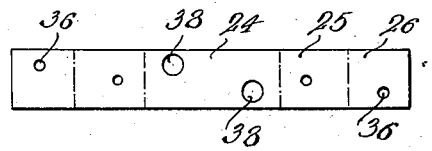
Figure 3 is a plan of the blank for the base or housing.
Figure 4:
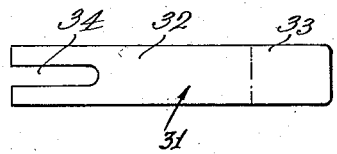
Figure 4 is a plan of the blank for the presser.

To enable the ready mounting of the case 23 upon the assembly base 10, the base plates are each apertured at 36 to receive fastening screws 37 therethrough, these apertures being located adjacent opposite longitudinal edges of the blank, as shown in Figure 3, and in order to facilitate assembly and emplacement of the screws, somewhat larger openings 38 are formed in the top plate portion 24 of the case, so that a screwdriver may be inserted to enable ready driving of the screws 37.

From the foregoing, it will be readily understood that in order to install one of my automatic adjusters upon brakes already in use, it is only necessary to drill and tap three small holes for the screws 35 and 37 and secure the parts in the positions shown. In the emplacement of the case 23 as before noted, it is desirable to locate it as close as practicable to the brake cylinder 16, and at a certain fixed spacing from the fully retracted position of the semi-circular shoe body proper, indicated at 13. It is not necessary that the device be located with the rod 28 extending radially with respect to the drum, but as shown in Figure 1, it may be at an angle somewhat less than 90 degrees to the immediately adjacent portion of the brake shoe. In forming the aperture for the screw 35 by which the presser finger is mounted, the latter should be axially centered with a line through the rod 28 and normal to the plate 10, and close to the inner edge of the flange 20. This opening being drilled and tapped, the screw 35 may be engaged therein, sufficient space between the head thereof and the flange 20 to permit insertion of the slotted end of the arm 32 under the head of the screw so that the shank of the screw is entered in the slot 34. The arm 32 is then adjusted longitudinally to bring the finger into proper relation to the end of the rod 28, by sliding the arm under the head of the screw while keeping it alined with the rod, until the finger 33 just barely engages the adjacent end of the rod 28 while the brake is applied, then tightening the screw to hold the arm as adjusted. If the brake is newly lined the arm 32 may be slightly backed off, so that the finger will clear the rod by, say, $\tfrac{1}{32}$ inch. The placement of the case 23 with respect to the brake shoe 13 should be such as to permit the inner end of the rod 28 to project from the casing a distance greater than the movement of the unlined shoe 13 from full retracted position to the flange 11 of the brake drum, so as to allow for full functioning of the device throughout a substantial range of wear of brake linings.

It is an advantage of the construction presented that the same device is adapted to use adjacent either of the shoes in a brake without change of design, and so that duplicates may be used on adjacent shoes in the same brake if needed; and it is a further advantage that where two of the adjusters are required in one brake, they do not have to be located at the same distances from the pivots of the respective brake shoes, as the device will function with brake shoes having different extents of movement, and will function on the same brake shoe at different distances from the pivot of the shoe.

It is apparent that the case 23 is adapted to be produced by simple cut-off and punch procedures, using simple strap stock, and the same is true of the adjuster arm and finger 32—33 and also the clutch plate 29, although if desired, to assure high efficiency in clutching the rod 28, the opening through the plate 29 is preferably bored smoothly instead of punched.

It will be readily understood from the foregoing that the device is adapted to be produced and retailed at a low cost well within the reach of the every-day motorist, as an accessory to be applied to vehicles already in use. Conversely, it may be adopted by motor vehicle manufacturers as standard equipment without adding objectionably to the cost, but contributing greatly to lowering maintenance costs for the user.

Having disclosed my invention in its best embodiment known to me at this time, it will, nevertheless, be understood that changes in the arrangement, construction and combination of parts, substitution of materials and equivalents, may be made therein without departing from the spirit of the invention within the scope set forth in the appended claims, wherein I claim:

1. An automatic brake adjuster for brakes of the character described comprising a case member adapted to be mounted fixedly in juxtaposition to a brake shoe, and having a rod slidable therethrough to engage the shoe, said rod exposed at its opposite end a distance beyond the case, and a presser finger for the rod adapted to be fixed on the shoe and movable with the shoe in line with the rod and inwardly thereof to engage the latter under wear of a lining on the shoe, and a clutch device for the rod on the case yieldable to movement of the rod by the presser but adapted to hold it against return.

2. The article of claim 1 in which said case comprises a strap metal member having opposite end portions bent at right angles to form end walls, said walls being apertured to receive the said rod therethrough as a guide, and having its extremities bent inwardly and stopping short of each other, said clutch device comprising a plate apertured to receive the rod slidably therethrough and having an edge portion set and loosely fitted between the extremities of the strap metal member, and a helical spring around the rod confined between the clutch plate and one of said end walls, said rod being projected beyond both end walls of the case.

3. The article of claim 1, wherein said presser device comprises a strap metal blank having an arm portion adapted to be secured upon a brake shoe and of a length to extend from the shoe beyond the inner end of said case and rod, said blank having a downturned end portion constituting a finger piece movable with the shoe to engage the inner end of said rod.

4. As an improved article of manufacture, a case for rod clutches of the general character described, comprising a sheet metal member having opposite end portions bent in one direction to form end walls, and having its extreme end portions bent inwardly to extend toward each other and stopping short of each other to form a slot therebetween, said end walls being apertured to receive a rod slidably therethrough, said slot being adapted to receive loosely therein a portion of a clutch plate in binding engagement with the rod, at least one of said extreme end portions being shaped and apertured to receive fastenings, the body of the plate thereover being apertured to receive a tool to manipulate the fastenings.

LEON E. THIBEAULT.